United States Patent Office
3,262,894
Patented July 26, 1966

3,262,894
FLAME RETARDANT URETHANE FOAM POLYMER
Harold A. Green, Havertown, Pa., assignor to Air Products and Chemicals, Inc., Philadelphia, Pa., a corporation of Delaware
No Drawing. Filed Sept. 13, 1962, Ser. No. 223,540
1 Claim. (Cl. 260—2.5)

This invention relates to polyurethanes characterized by a sufficient resistance to combustion under normal conditions of use to be designated as flame retardant.

If combustion is initiated and maintained at a sufficiently high temperature at a sufficiently high concentration and pressure of oxygen most organic materials are combustible. However, under normal conditions in which flame retardant characteristics are of value, flame retardant materials do not permit a zone of combustion to extend very far beyond the high temperature region. In tests for flame retardancy the article is first ignited by a torch, and may undergo a combustion, melting, or other marked physical and/or chemical change while heated by the torch; and then the external heating is discontinued and finally there is measurement of the increase in the zone of damage subsequent to the removal of the torch. If the article is flame retardant, the zone of damage does not extend itself significantly after the external heat (e.g., by torch) is discontinued. Flame retardant compositions are sometimes described as having a property such that initial combustion of a portion thereof tends to be self-extinguishing, which property is sometimes briefly summarized as featuring self-extinguishing flames.

Inasmuch as urethane polymers are organic and polyurethane foams in particular have cell walls which are thin and combustible, the use of unmodified polyurethane may involve an appreciable fire hazard which has discouraged the use of polyurethanes particularly as foam for certain applications, such as in insulation. Proposals have been made for the manufacture of polyurethane foam materials, such as the cores in insulation panels, characterized by flame retardancy, but the costs of imparting the flame retardancy to the polyurethane foam has heretofore been excessively great. Moreover, in using certain of the flame extinguishants proposed by prior art workers, the density of the polyurethane foam has been unduly increased. Thus, urethane foams to compete successfully with other commercial panel insulation materials should have densities in the range about 1 to 3 pounds per cubic foot, less than 48 grams/liter. Polyurethane foams at noticeably higher densities may have greater flame retardancy and desirable physical properties for other uses. Likewise non-foamed flame retardant polyurethanes are desired in some uses.

In accordance with the present invention a flame retardant composition consists predominantly of a urethane polymer prepared by the interaction of an organic compound having at least 2 isocyanato groups and an organic compound having at least 2 alcoholic hydroxy groups, said composition containing a mixture of an organic flame retardant agent and an inorganic flame retardant agent, said organic flame retardant agent containing components such that the total weight of halogen and phosphorus analyzable therein is within the range from 0.1 to 10% of the weight of the composition and the weight ratio of the halogen to phosphorus is less than 6 to 1, and said inorganic flame retardant agent contains oxide of a metal having an atomic number less than 14, the amount of such metal oxide in the residue remaining after calcination of the inorganic flame retardant agent being at least 25% by weight of such residue, and said inorganic flame retardant agent containing hydrated water of crystallization such that during thermal dehydration, at least 100 calories are adsorbed per gram of inorganic flame retardant agent dehydrated, said inorganic flame retardant agent being present in a concentration within the range from 11% to 30% of the composition.

A highly hydrated aluminaceous material is a term designating herein a material within the terms of the invention and which has water of crystallization whereby a large quantity of heat is absorbed by the thermal decomposition of the hydrate. For example, alumina trihydrate absorbs 385 calories per gram of trihydrate decomposed, thus exceeding most crystalline hydrate materials. Certain natural and synthetic aluminosilicates and magnesiumsilicates have water of crystallinity, whereby more than 100 calories per gram of hydrate are absorbed during thermal dehydration. Thus, the term "highly hydrated material containing a substantial amount of a refractory oxide of a metal having an atomic number less than 14" excludes dehydrated alumina gels subjected to high humidity to contain significant amounts of sorbed moisture not bound as water of crystallization. The determination of whether a material is within said term is made by measuring the heat absorbed by the thermal dehydration of the material, and designating it as highly hydrated only if such heat exceeds 100 calories per gram. The calcined residue is chemically analyzed and the material is designated as containing a significant amount of refractory oxide of a light metal only if the analysis indicates that the calcined residue contains a refractory oxide of a metal having an atomic number less than 14 in an amount more than 25% by weight. It is convenient to provide examples of aluminaceous material without being limited thereto except in actual examples, and compositions comprising magnesium and meeting similar requirements may be substituted in part or in toto for the aluminaceous portion of such compositions.

Some organic phosphates contain organically bound halogen, but in some compositions, a separate component provides organic bound halogen. In achieving flame retardancy in aluminaceous modified urethane polymers, organic phosphate must be present in a sufficient amount; but organic halides may be employed to lessen the phosphate requirements if the weight of halogen atoms is less than six times the weight of the phosphorus atoms. While it is possible to achieve flame retardant polyurethanes without use of the highly hydrated aluminaceous powder if the quantity of organic phosphate (possibly cheapened by admixture with the organic halides) is from about more than double to ten times the quantity employed herein, particular attention is directed to the fact that the physical properties of the polyurethane product containing the aluminaceous material are superior to those containing such very large amounts of phosphate and halide compounds. The synergistic effect of the presence of the hydrated aluminaceous materials is both unexpected and desirable. Moreover, both the cost of raw materials and the cost of the completed fire retardant urethane polymers are lowered by the use of the highly hydrated aluminaceous material for reducing the phosphate and halide requirements to less than half of what they would be in the absence of the aluminaceous material.

Commercially available alumina trihydrate has a particle size range generally within the range from about 0.5 to about 80 microns, mostly within the 0.5 to 5 micron range. Such size ranges are also desirable for any other material coming within the terms of this invention and employed in fire retardant urethane polymeric compositions. One of the important reasons for the outstanding superiority of alumina trihydrate is that it absorbs 385 calories per gram of decomposed alumina trihydrate. It should be noted that although previous workers have suggested alumina trihydrate as a filler in organic compositions, it has generally not been treated as a flame retardant in the same sense that antimony oxide, stannic oxide, and the like have been recommended as flame extinguishants. Moreover, highly hydrated aluminaceous material and alumina trihydrate have been shown in prior literature to be so ineffective flame retardants when used as the only filler agents that it is surprising that alumina trihydrate has a synergistic effect whereby, in combination with selected phosphate ester type flame extinguishants superior flame retardant polyurethanes are achieved.

Alpha alumina trihydrate has a density of only 2,420 grams/liter and thus has a significant advantage over some of the other inorganic components which have been proposed as flame retardants for plastic foams. Moreover, alumina trihydrate is marketed at a price significantly less than the price of some of the inorganic fillers which have been proposed as flame retardants. Other suitable additives include naturally occurring earths and clays, such as halloysite, kaolins and chrysotile, which have an even greater price advantage.

Some of the inorganic materials which have been proposed previously as flame retardants for plastic foams have such a high density that the inclusion thereof in plastic foams significantly impairs the ease of achieving a density less than 48 grams/liter. For example, zinc oxide, which has a density of 5,470 grams/liter or 113 times the desired density, has been employed as a flame retardant in some plastic compositions Halogenated hydrocarbons such as chlorinated naphthalene and/or chlorinated paraffin wax also have a troublesomely high density.

The nature of the invention is further clarified by reference to a plurality of examples.

EXAMPLE I

Several samples of rigid foam core insulation panels were prepared using standard formulations and standard procedures and varying the type and amount of flame retardant modifiers. The insulation panels which burned when tested in accordance with the A.S.T.M. procedure D1692–59T, were designated as burnable or "B," and those which passed the tests were designated as self-extinguishing or "SE." Each sample was prepared by a standard procedure from a standard mixture comprising a polyhydroxy resin (conveniently designated as a polyol) diisocyanate prepolymer, additional polyol, effective catalyst and blowing agent. Some plastic formulations set forth minor constituents as parts per 100 parts (p.p.h.) of resin, but the analysis of the final composition is also a useful expression of the percentage by weight of each minor constituent. The data relating to certain samples are set forth in Table 1.

The concentration of phosphorus in $(ClC_2H_4O)_3PO$ is about 10.9% and the concentration of chloride is about 37%, thus providing a Cl/P ratio of about 3.4 to 1. Thus the concentration of phosphorus in the previously described Sample No. 5 is 0.37%, and the concentration of chlorine atoms is 1.26%, totalling 1.63% for phosphorus plus chlorine. Because the weight concentration of trichloroethyl phosphate is about 2.15 times such P/Cl concentration, the 1.63% P/Cl corresponds to 3.4% trichloroethyl phosphate.

Particular attention is called to the fact that alumina trihydrate by itself fails to impart self-extinguishing characteristics even when employed in relatively large amounts (Sample No. 4). Moreover, the data (Sample No. 2) indicate that tris (2-chloroethyl) phosphate ester by itself is effective only when the concentration is of the magnitude of 14% of the total composition, and this concentration is greater than economically feasible or convenient in the manufacture of polyurethane foam.

By a series of tests along the lines of those shown in Table 1, it is established that the concentration of alumina trihydrate should be at least 11% and less than 30% of the total composition. Similarly, the concentration of tris (2-chloroethyl) phosphate ester should be such that the phosphorus atom concentration is at least 0.1% and the total phosphorus plus halogen concentration is within the range from 0.1 to 10%. This corresponds to from 0.215 to 21.5% by weight tris(2-chloromethyl) phosphate.

In making the insulation panels, it is desirable to allow a prepolymer to react with a polyol containing a blowing agent, which may be a fluorinated hydrocarbon which is gaseous at the elevated temperature at which much of the foaming occurs.

A suitable resin characterized by about three hydroxyl groups per molecule may be prepared by interacting glycerol and an excess of propylene oxide to form a reaction product which might be designated as 1,2,3-tris (hydroxypropylpolypropylene ether) propane but which is more conveniently designated as a polypropyleneetherglycerol. From this reaction product, there is separated a polyol having a high molecular weight and moderately high viscosity, such as a viscosity of 4,500 centistokes at 100° F. One example of a suitable polyol having a viscosity of 4,500 centistokes at 100° F. is a polyhydroxy resin known as Voranol RN600.

Trishydroxypropylglycerol may be prepared by the interaction of glycerol and three mols of propylene oxide thereby providing a reaction product having a hydroxyl number of about 630 and having a hydroxyl equivalent weight of 89. A suitable prepolymer may be prepared by reacting such trishydroxypropylglycerol with an excess of tolylene diisocyanate (570 g. TDI per 100 g. polyol) whereby unreacted —NCO groups constitute about 34% of the weight of the prepolymer. Such prepolymer has a viscosity of about 30 centistokes at 100° F. One example of a suitable prepolymer having a viscosity of about 30 centistokes at 100° F. and about 34% —NCO groups is a prepolymer known as Voranate R2. Further information concerning this prepolymer is given in Vorane brochure No. V–4, published about September 1960 by Dow Chemical Company.

TABLE 1

| Sample | G./l. dens. | Kg./cm.² tens. | Kg./cm.² crush | $Al_2O_3 \cdot 3H_2O$ P.p.h. polyol | $Al_2O_3 \cdot 3H_2O$ Percent of comp. | $(ClCH_2CH_2O)_3PO$ P.p.h. polyol | $(ClCH_2CH_2O)_3PO$ Percent of comp. | ASTM Test D1692–59T |
|---|---|---|---|---|---|---|---|---|
| 1 | 35.2 | 2.74 | 1.97 | 0 | 0 | 14.0 | 12.3 | B. |
| 2 | 33.7 | 2.53 | 1.55 | 0 | 0 | 16.3 | 14.0 | SE. |
| 3 | 33.6 | 1.9 | 1.76 | 16.3 | 14.0 | 0 | 0 | B. |
| 4 | 35.2 | 0.67 | 1.12 | 26.6 | 20.2 | 0 | 0 | B. |
| 5 | 35.2 | 1.55 | 1.26 | 21.0 | 16.8 | 4.3 | 3.4 | SE. |

The insulation panels shown in Table 1 were prepared by interaction of the formulation consisting of:

| | |
|---|---:|
| Prepolymer (1,2,3 tris hydroxypropylpolpropyleneetherpropane-prepared as above) | 98 |
| Polyol (reaction product of 570 g. TDI and 100 g. tris hydroxypropylglycerol-prepared as above) | 75 |
| Trichlorofluoromethane | 28 |
| Water soluble silicone | 1 |
| Triethylenediamine | 1 |
| Flame proofing agent | Varied |

The water soluble silicone is a polyalkyleneetherglycol derivative of a polydimethylsiloxane. A polysiloxane-polyoxyalkylene block copolymer prepared in accordance with the disclosure in U.S. Patent No. 2,834,748 is marketed as the L-520 brand of water soluble silicone oil. The heat resulting from the interaction of polyol and prepolymer initiates the vaporization of the trichlorofluoromethane, which brings about foam formation. Each of the flame retardant agents may be incorporated into the polyurethane-forming composition separately. The mixture of flame retardant agents can be prepared by dissolving the chloroethylphosphate ester in a volatile solvent such as pentane and/or dichloromethane, impregnating the solution into powdered alumina trihydrate, and volatilizing the solvent to prepare flowable dry powder containing the correct proportion of chloroethylphosphate ester. This flame retardant mixture is desirably dispersed in each of the polyol and prepolymer (about half of the desired amount in each) prior to mixing of the polyol and prepolymer. However, the flame retardant may be dispersed entirely in either the polyol or prepolymer.

EXAMPLE II

A flame retardant plastic foam having a density less than 80 grams/liter was prepared from a composition consisting of:

| | |
|---|---:|
| Voranate R2 prepolymer | 98 |
| Voranol RN600 polyol | 75 |
| Water soluble silicone oil L-520 | 1 |
| Triethylenediamine | 0.3 |
| Trichlorofluoromethane | 26 |
| Alumina trihydrate | 45 |
| Tris beta chloroethoxy phosphate ester | 10 |

This flame retardant plastic foam was subjected to compressive strength tests, and yielded at 23 lb./sq. in. Its tensile strength was 37 lbs./sq. in., and its K factor was 0.13 B.t.u./hr.=ft.$^2$ ° F./in., thus making it suitable for use in insulation panels such as ceiling tiles.

EXAMPLE III

An insulation panel was prepared from a composition having the following parts by weight:

| | |
|---|---:|
| Polyol (Voranol RN600) | 21.8 |
| Prepolymer (Voranate R2) | 33.7 |
| Blowing agent (trichlorofluoromethane) | 15.7 |
| Catalyst (triethylenediamine) | 0.2 |
| Catalyst (tin octoate) | 0.1 |
| Surface tension agent (polyalkyleneether silicone) | 0.5 |
| Tris chloroethoxyphosphate | 8.0 |
| Alumina trihydrate | 20.0 |

The insulation panel was a rigid polyurethane foam having a density less than 48 g./l. and good insulation characteristics.

EXAMPLE IV

A series of insulation panels with polyurethane cores having a density less than 48 g./l. were prepared containing varying amount of Fyrol 6, and it was established that the minimum concentration of Fyrol 6 effective in imparting fire retardancy to the panels was 14% by weight. An insulation panel containing less than half such proportion of Fyrol 6 was prepared by including 20% alumina trihydrate and 6% Fyrol 6 in the composition. Fyrol 6 is diethyl di(betahydroxy ethyl) aminomethane phosphonate having a formula $$(HOC_2H_4)_2NCH_2P(O)(OC_2H_5)_2$$

EXAMPLE V

A flexible (as distinguished from rigid) polyurethane foam was prepared using TDI and a polyol having an average molecular weight of about 4000 and a hydroxyl number of about 45, the foam-forming mixture for the flexible foam having the following composition:

| | |
|---|---:|
| Polyol | 40.8 |
| Tolylenediisocyanate | 15.8 |
| Water | 1.2 |
| Triethylenediamine | 0.4 |
| Stannous octoate | 0.05 |
| Silicone L-520 | 1.75 |
| Tris(2-chloroethyl) phosphate | 15.0 |
| Alumina trihydrate | 25.0 |
| | 100.00 |

The resulting flexible polyurethane foam had acceptable foam properties. Moreover, it was flame retardant because it was prepared using tris (2-chloroethyl) phosphate and alumina trihydrate as the flame retardant agents. Thus, the usefulness of highly hydrated inorganic material is not restricted to rigid polyurethane foams, but is generally applicable to polyurethane compositions. This example also demonstrates the flame retardancy of urethane compositions prepared using the one shot technique instead of prepolymer technique.

EXAMPLE VI

Some polyhydroxy resins are marketed as the reaction products of propylene oxide and sorbitol, having hydroxypropyl polypropylene ether chains attached to the hexane (sorbitol) chain. A polypropoxysorbitol polyalkylene ether polyol having a hydroxy number of 620 is available as Atlas G2566. Prepolymers may be prepared by the reaction of such resins with excess TDI. A prepolymer containing 28.8% excess isocyanate is available as Isocyanate Product G-102. A rigid insulation panel of low density was prepared from the following composition:

| | |
|---|---:|
| Polyol (Atlas G2566; 620 OH No.) | 21.9 |
| Prepolymer (Isocyanate Prod. G102; 28.8% excess —NCO) | 35.6 |
| Triethylenediamine | 0.3 |
| Silicone (L-520) | 0.7 |
| Trichlorofluoromethane | 13.5 |
| Tris-2-chloroethyl phosphate | 8.0 |
| Alumina trihydrate | 20.0 |
| | 100.0 |

The insulation panel was fire retardant when tested by ASTM 1692 procedure.

EXAMPLE VII

A series of insulation panels was prepared in which the polyurethane foam cores were prepared in a substantially identical manner from ingredients which were the same and in the same quantities with the exception that the water-containing additives differed as indicated below.

| | Percent |
|---|---:|
| Polyol (Voranol RN600) | 23.6 |
| Prepolymer (Voranate R2) | 30.75 |
| Catalyst (triethylenediamine) | 0.6 |
| Catalyst (tin octoate) | 0.05 |
| Blowing agent (trichlorofluoromethane) | 15.5 |
| Surface tension agent (silicone oil L-520) | 0.7 |
| Tris-2-chloroethyl phosphate | 8.0 |

Additive—Continued Percent
Sample A:
 Vermont Chrysotile (hydrated magnesia silicate) _____ 20
Sample B:
 Georgia Kaolin _____ 20
Sample C:
 Bauxite (Porocel) _____ 20

The several samples were given a five minute treat at 105° C. They had generally similar cream time of 13 seconds, rise time of one minute and fifty seconds, and were tack free in four minutes. The samples were tested for fire retardancy by the Underwriter Test 94 (UFLT94) which corresponds in general with the ASTM D1692–59T test except that the results are more stringently interpreted. All three samples passed the test by a good margin.

In a similar series in which the composition differed only in the additive employed (including ferric oxide, lead oxide, titanium dioxide, or carbon black) none passed the fire retardancy test.

EXAMPLE VIII

By a series of preparations it is established that in making a flame retardant polyurethane composition, most of the total composition must be a polyurethane, that is, derived from the reaction of a compound having at least two isocyanato groups with a compound having at least two alcoholic hydroxy groups. The concentration of organic flame retardant material must be such that atoms of the group consisting of halogens and phosphorus provide from 0.1 to 10% of the total composition, and the weight ratio of halogen to phosphorus must be less than 6 to 1. Generally, the concentration of organic flame retardant material is desirably less than half that sufficient by itself to impart flame retardancy to the composition. The concentration of inorganic flame retardant such as a highly hydrated alumina, the calcined residue of which contains at least 25% of light refractory metal oxides (e.g., alumina and/or magnesia are refractory oxides of metals having an atomic number less than 14) and which absorbs at least 100 calories per gram upon thermal dehydration, must be within the range from 11% to 30% of the total composition. The polyurethane foam composition containing the fire retardant combination of organic phosphorus compound and highly hydrated inorganic material preferably should have a density less than 48 g./l.

Among the organic phosphate compounds which may be employed in accordance with the present invention are tris (2-chloroethyl) phosphate; tris (chlorophenyl) phosphate; tricresyl phosphate; tris-2,3-dibromopropyl-phosphate and the polymeric reaction product of a mixture of three moles ethylene glycol and about two moles of phosphoric acid.

Among the highly hydrated and/or hydrous materials containing a significant amount of a refractory oxide of a metal having an atomic number less than 14 which may be employed in accordance with the present invention are alumina trihydrate, kaolin, halloysite, bauxite, and chrysotile.

Among the suitable materials containing isocyanato groups are tolylene diisocyanate, naphthalene diisocyanate, and diphenyldiisocyanate. Among the suitable materials containing alcoholic hydroxy groups are polypropylene glycol, polytetramethylene glycol, and reaction products of epoxyalkanes with compounds such as glycerol, pentaerythritol, and mannitol.

It will be noted that each of the flame retardant compositions of the present invention consists essentially of an intimate mixture of a predominant amount of the reaction product of an organic compound having at least two isocyanato groups and an organic compound having at least two alcoholic hydroxy groups, said composition containing a material providing at least 0.1% but less than 10% by weight of atoms of the group consisting of halogens and phosphorus, the halogen to phosphorus ratio being less than 6 to 1 and said composition also containing at least 11% but less than 30% of a highly hydrated material containing water of crystallization such that during thermal dehydration more than 100 calories are absorbed per gram of hydrated material, and after the calcining of the hydrated material, the residue containing at least 25% by weight of a refractory oxide of a metal having an atomic number less than 14.

Obviously, many modifications and variations of the invention as hereinbefore set forth may be made without departing from the spirit and scope thereof, and therefore only such limitations should be imposed as are indicated in the appended claim.

What is claimed is:

In a polyurethane foam composition consisting predominantly of the reaction product of a precurseor containing trichlorofluoromethane foaming agent, an organic compound having at least two isocyanato groups and an organic compound having at least two alcoholic hydroxy groups selected from the group consisting of polypropylene glycol, polytetramethylene glycol and reaction products of an epoxyalkane with a compound selected from the group consisting of glycerol, pentaerythritol, mannitol and sorbitol, the improvement of imparting flame retardancy to said composition by incorporating in said precursor the combination of tris(2-chloroethyl) phosphate in a weight concentration within the range from 0.215 to 21.5% and alumina trihydrate in a weight concentration within the range from 11% to 30%.

References Cited by the Examiner
UNITED STATES PATENTS

| | | | |
|---|---|---|---|
| 2,577,281 | 12/1951 | Simon et al. | 260—2.5 |
| 3,015,634 | 1/1962 | Ferrigno | 260—2.5 |
| 3,021,290 | 2/1962 | Gmitter et al. | 260—2.5 |
| 3,099,676 | 7/1963 | Lanham | 260—2.5 |

LEON J. BERCOVITZ, *Primary Examiner.*

D. E. CZAJA, *Assistant Examiner.*